No. 802,868. PATENTED OCT. 24, 1905.
W. H. LAUDE.
RIVET CUTTER.
APPLICATION FILED APR. 5, 1905.

Witnesses
M. A. Schmidt
Geo. E. Tew

Inventor
William H. Laude,
by Milo B. Stevens & Co.
Attorneys.

UNITED STATES PATENT OFFICE.

WILLIAM H. LAUDE, OF MONTICELLO, IOWA.

RIVET-CUTTER.

No. 802,868.      Specification of Letters Patent.      Patented Oct. 24, 1905.

Application filed April 5, 1905. Serial No. 254,005.

*To all whom it may concern:*

Be it known that I, WILLIAM H. LAUDE, a citizen of the United States, residing at Monticello, in the county of Jones and State of Iowa, have invented new and useful Improvements in Rivet-Cutters, of which the following is a specification.

This invention is a rivet-cutter designed particularly for shearing or cutting off the ends of rivets when projecting from a piece of work.

The object of the invention is to produce a rivet-cutter characterized by strength and simplicity and ease in the cutting operation.

The invention is illustrated in the accompanying drawings, in which—

Figure 1:
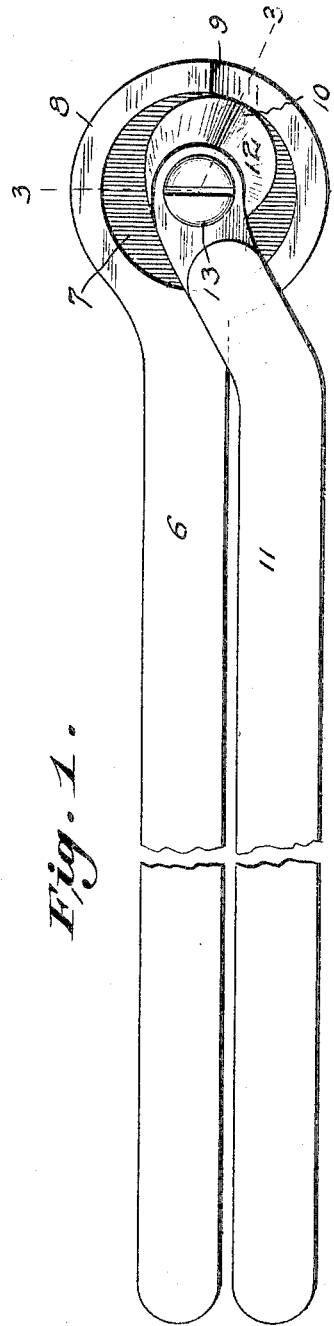
Figure 2:
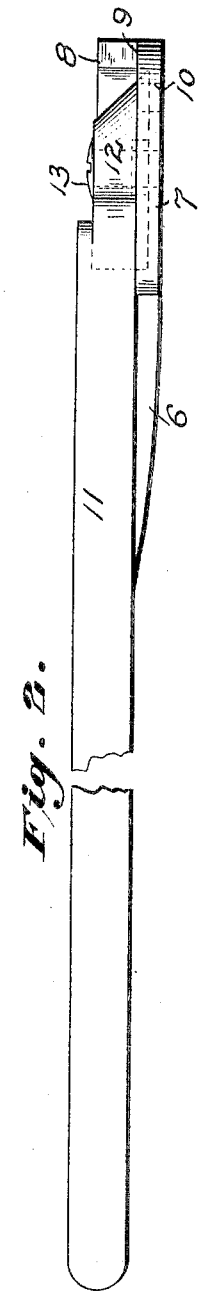
Figure 3:
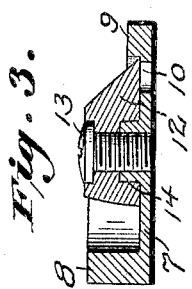

Figure 1 is a plan view; Fig. 2, an edge view, and Fig. 3 a section on the line 3 3 of Fig. 1.

The device consists of a pair of lever-handles pivoted together, one handle having a head with a hole which is placed over the rivet so that the latter will project through the hole and the other handle having a cam-shaped cutting edge which shears the projecting edge of the rivet when the handles are brought toward each other.

Referring specifically to the drawings, 6 indicates one handle having at the front thereof a head consisting of a circular plate 7, having around the edge thereof a raised rim 8, which is cut away on one side, as at 9, to allow the turn of the other handle which carries the cutting edge. The plate 7 has a hole 10, through which the rivet projects when the device is placed thereover in use. The other handle is indicated at 11 and has at the front end a cam-shaped blade 12, whose cutting edge shears across the hole 10. The head 12 is pivoted to the plate 7 by a screw 13, which screws into a threaded hole at the center of the plate 7, said hole being surrounded by a projecting collar 14, which fits in a circular recess formed in the under side of the head 12.

The plate 7 is comparatively thin, so that when laid upon a piece of work the rivet may be sheared off quite close to the surface of the work. The rims 8 and 9 and the collar 14 give the necessary strength to stand the shearing strain, and so permit the plate to be made thinner than would otherwise be the case. Also the collar 14 forms a bearing for the head 12, so that the strain of the cutting action comes on the collar and not on the pivot-screw 13. This is an important advantage, since otherwise a heavy bolt or screw would have to be used to stand the pressure.

In operation the handles are opened, so that the end of the rivet will come through the hole 10, and the handles are then closed toward each other, causing the cam edge of the blade to shear across the hole and cut off the end of the rivet.

What I claim as new, and desire to secure by Letters Patent, is—

A cutting implement comprising a pair of pivoted handles one of which has at the head a circular plate provided with a strengthening-rim around the outer edge and an opening therethrough, and a pivot-hole at the center having a projecting collar around the same, and the other of which has a head fitting upon the plate within said rim, with a cutting edge which shears across said opening, and a recess on the under side fitting over the collar.

In testimony whereof I have signed my name to this specification in the presence of two subscribing witnesses.

WM. H. LAUDE.

Witnesses:
     JOHN H. BACHER,
     ROBERT ABEL.